Jan. 19, 1954   J. L. DEFFENBAUGH   2,666,674
TRACK ROLLER
Filed April 3, 1951
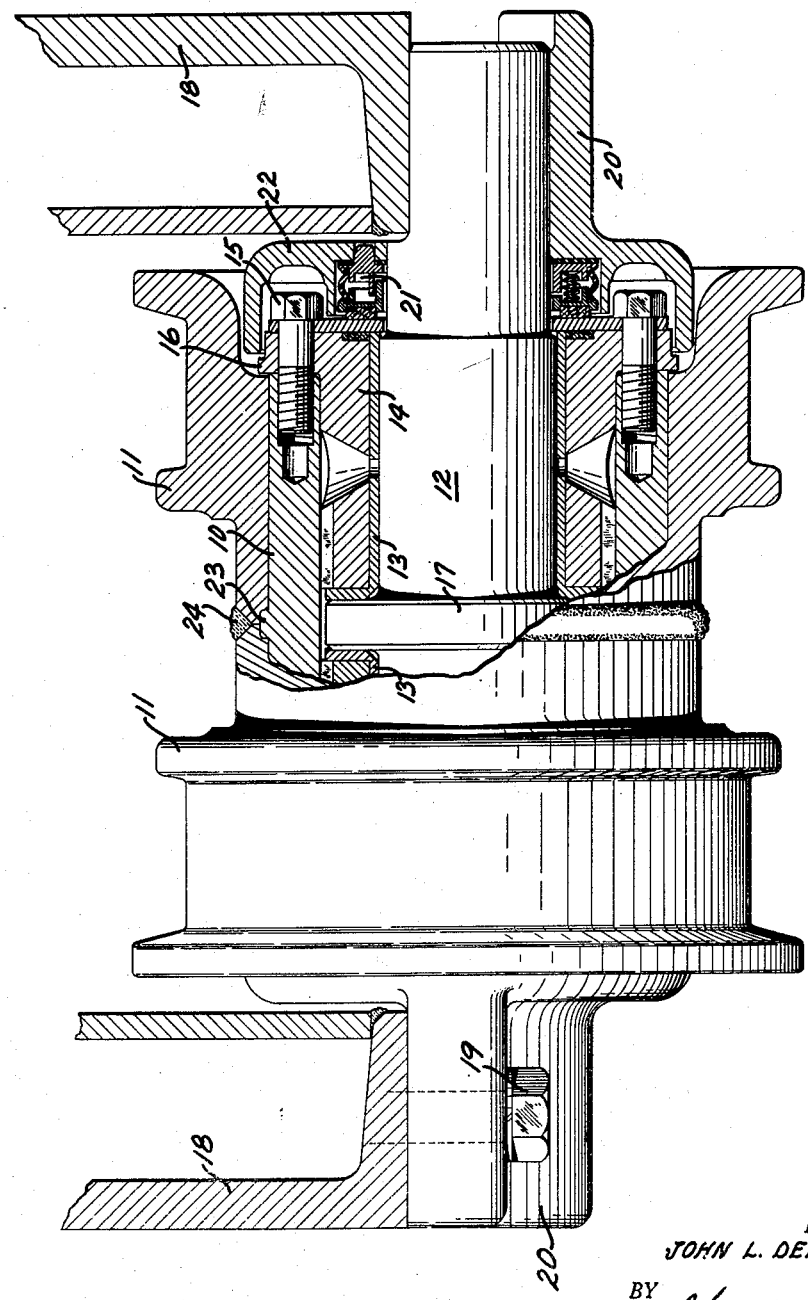
INVENTOR.
JOHN L. DEFFENBAUGH
BY Charles M. Fryer
ATTORNEY.

Patented Jan. 19, 1954

2,666,674

UNITED STATES PATENT OFFICE 2,666,674

TRACK ROLLER

John L. Deffenbaugh, Peoria, Ill., assignor to Caterpillar Tractor Co., Peoria, Ill., a corporation of California Application April 3, 1951, Serial No. 218,965

2 Claims. (Cl. 305—1)

This invention relates to wheels or rollers in general and more particularly to rollers of the type adapted to engage a rail surface or the like.

The present invention will have many applications, but is especially useful for and will be disclosed herein as applied to track rollers of the type commonly employed on a track-type tractor for supporting the main body of the tractor on the rail surface of the endless track mechanism.

In a track-type tractor, the track rollers are subjected to extremely heavy duty in an environment of a particularly abrasive nature and are subjected to severe and frequent impact loads. As a result, it has been the practice in many track rollers to provide hubs of a material having a low modulus of elasticity and high strength in compression such as cast iron to resist deformation due to impact loads. The hubs are provided with separate rims of forged steel which may be heat treated to provide wear resistant surfaces. These rims are usually pressed on to the hubs and held against axial movement between raised shoulders on the hub and suitable lock rings or end collars.

In rollers of this type, considerable difficulty has been encountered due to the rims coming loose and working off the hub during operation. Loosening of the rim is caused by growth or bellmouthing of the rim bore adjacent its outer end under the severe pounding encountered. As a result, the press fit between the rim and hub is destroyed, and the effectiveness of the locking device is reduced allowing relative axial movement of the rim and hub.

It is, therefore, an object of the present invention to provide a track roller of the type described having improved means for locking the rims against axial movement relative to the hub.

It is another object of the present invention to provide a track roller of the type described in which the effect of rim bore growth on the locking means preventing relative axial movement between the rim and hub is minimized.

Other objects and advantages of the present invention will be made apparent in the following description wherein reference is made to the accompanying drawing.

In the drawing, a track roller embodying the present invention is illustrated partially in elevation and partially in section.

The track roller in the drawing is shown as having a hollow hub 10 and a pair of flanged rims 11 adapted to engage the rail surface of the endless track mechanism of a track-type tractor, not shown. The hub is carried for rotation about a shaft 12 and is provided with spaced bearings 13 held in place by bushings 14 secured to the hub by cap screws 15 extending through outwardly extending flanges 16 provided on the bushings. The shaft 12 is provided with a central thrust collar 17 and is rigidly clamped to spaced beams 18 forming a part of the track roller supporting frame by cap screws 19 extending through suitable ears provided on end collars 20 embracing the shaft. The bearings are protected from the entrance of dirt or other foreign material by conventional face-type seals, only one of which is illustrated at 21 as disposed within a cup-like flange 22 formed on each of the end collars 20.

The hub is preferably made of a material having a low modulus of elasticity and high compressive strength such as cast iron or the like and is provided intermediate its ends with a raised rib 23. The rims 11 are preferably made from forged steel heat treated to provide a hard, wear resistant surface and a relatively tough core to resist impact loads. After heat treatment, the rims are pressed and shrunk on to the hub, and their abutting ends are joined as by welding indicated at 24. The abutting ends of the roller rims are counterbored to provide a recess as shown to fit over the rib 23 positively locking the rims against axial movement relative to the hub. The rib 23 is centrally located on the hub well out of the area subject to pounding, and as a result enlargement of the rim bore adjacent the outer edges has substantially no effect on its locking efficiency. Furthermore, since it is necessary to counterbore and therefore reduce the thickness of the rim portions to accommodate the rib 23, it is most desirable that it be disposed centrally. With this location a maximum thickness is obtained in those parts of the rim that are subjected to the greatest impact loading.

I claim:

1. A track roller comprising a cylindrical hub with a circumscribing rib projecting from its periphery intermediate its ends, a pair of flanged rims adapted to be fitted on the hub from opposite ends to meet at the center of the hub, said rims being counterbored to receive said rib, and means securing the rims together at their meeting portions and intermediate their load bearing areas whereby the rib will prevent endwise displacement of the rims on the hub.

2. In a track roller which comprises a cylindrical hub and a pair of rim portions carried thereby to provide spaced track engaging parts disposed adjacent the opposite ends of the hub, an enlargement disposed generally centrally of the hub and out of the area embraced by the track engaging portions of the rims, the interior of the rims being enlarged to embrace said enlargement on the hub, and means securing the rims against endwise separation.

JOHN L. DEFFENBAUGH.

References Cited in the file of this patent

UNITED STATES PATENTS

| Number | Name | Date |
|---|---|---|
| 1,437,092 | Clark | Nov. 28, 1922 |
| 1,474,918 | Schneider | Nov. 20, 1923 |
| 1,835,231 | Loock | Dec. 8, 1931 |
| 2,049,693 | Eberhard | Aug. 4, 1936 |
| 2,283,871 | Norelius | May 19, 1942 |
| 2,329,901 | Herrington | Sept. 21, 1943 |
| 2,393,993 | Knox | Feb. 5, 1946 |
| 2,615,764 | Leake | Oct. 28, 1952 |